Dec. 7, 1965 R. L. BERKE 3,221,987

RECORD FEEDING DEVICE WITH BACKSPACE MECHANISM FOR CHADLESS PERFORATED RECORDS

Filed Sept. 20, 1963 2 Sheets-Sheet 1

INVENTOR.
RALPH L. BERKE

BY Strauch, Nolan & Neale

ATTORNEYS

Dec. 7, 1965 R. L. BERKE 3,221,987

RECORD FEEDING DEVICE WITH BACKSPACE MECHANISM
FOR CHADLESS PERFORATED RECORDS

Filed Sept. 20, 1963 2 Sheets-Sheet 2

INVENTOR.
RALPH L. BERKE

BY Strauch, Nolan & Neale
ATTORNEYS 3,221,987

RECORD FEEDING DEVICE WITH BACKSPACE MECHANISM FOR CHADLESS PERFORATED RECORDS

Ralph L. Berke, Park Ridge, Ill., assignor to SCM Corporation, New York, N.Y., a corporation of New York Filed Sept. 20, 1963, Ser. No. 310,366
11 Claims. (Cl. 234—129)

This invention relates to coded data processing perforated record feed apparatus and more specifically to backspacing mechanisms used in conjunction with perforators which punch a flat record with discontinuous holes resulting in lidded apertures, known in the art as chadless tape or records.

Chadless tape backspacing mechanisms have been proposed previous to the present invention but they have employed multiple or complex components such as spring loaded pins or rotatable plural fingers to either eject the lids of the chadless tape from the punch dies or to otherwise assure that the lids are closed during a backspacing operation in which the tape and hence the normally trailing lids must be smoothly moved past the punch die holes in a reversed direction. Those previously known devices require extremely close machining tolerances between the punching dies and the lid closing apparatus and are difficult as well as expensive to manufacture. These disadvantages are multiplied in the case of certain ones of those prior art devices which do not permit manufacture by cylindrical grinding due to the complexity of their punch and die design. Also, certain mechanical functions associated with many of the previously known backspacing mechanisms are continuously operative even during the normal forward stepping function which adds excessive wear to backspacing components even when they are not engaged in backspacing. Others of the prior art chadless tape perforators have utilized electro-magnetic tape lid closing controls during backspacing which results in a substantial increase in cost of manufacture.

The present invention incorporates a simple aperture lid closing device in an automatic feed device for a tape perforator including a tape backspacing mechanism, the forward tape feeding function and several safety blocking functions between the tape feed and the backspace components deriving power from a punch arm assembly which is cyclically rocked by a rotating cam. A pawl attached to one end of the punch arm moves upward and engages the tape feed ratchet, rotating it one step which, in turn, rotates the tape feed sprocket, moving the tape forward one character space at a time. When it is desired to move the tape back one space, a backspace lever is depressed. This actuation disrupts the normal path of engagement between the pawl and the tape feed ratchet and simultaneously causes the backspacing mechanism to engage and to step the tape back one character space. The aperture lid closing structure is a unique, very simple and inexpensive device, in the form of a lid leveling lever blade employed to press the lids on the tape perforations to their closed condition during a cycle of backspacing, the blade moving into its backspace operative position only when the backspace lever is depressed and there is no actual punching in process.

Accordingly, a primary object of this invention resides in the provision of a perforated record feeding device a portion of which is structurally and functionally coordinated with a unique backspacing mechanism enabling satisfactory backspacing of chadless records, e.g., tape whose apertures are lidded.

Another object of this invention resides in the provision of novel linkage which positively over-rides the backspace lid closing blade action should the perforator undergo a normal punching cycle during backspacing.

A further object of this invention is to provide in a perforator, a novel lever and blade device coordinated with operation of the combination to close the hinged lids of chadless perforations in flat sheet or strip records as the record undergoes reverse movement toward, into and through the die assembly during one or more backspacing functions.

Further novel features and other objects of this invention will become apparent from the following detailed description, discussion and the appended claims taken in conjunction with the accompanying drawings showing a preferred structure and embodiment, in which:

Figures 1, 2, 3:
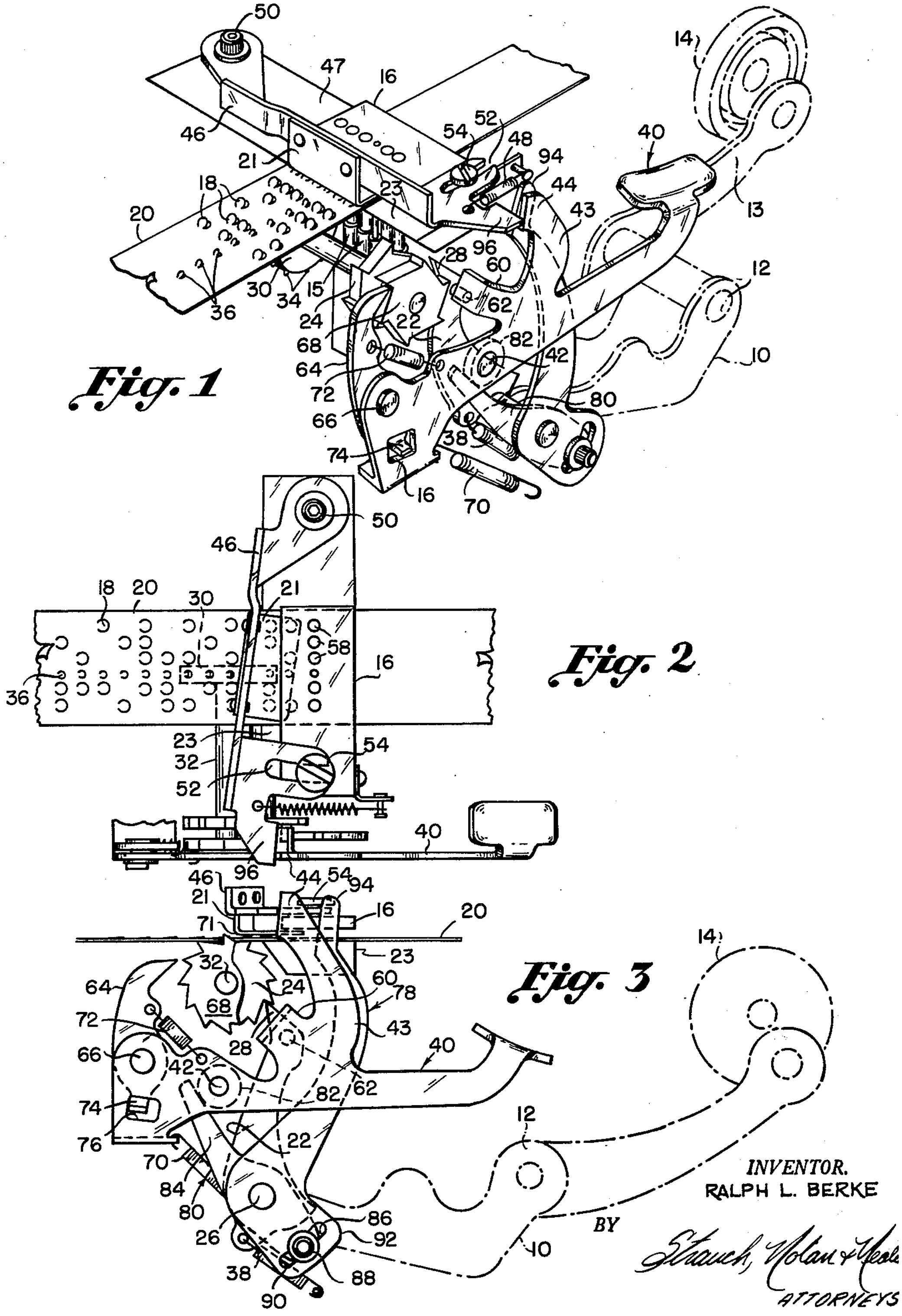
FIGURE 1 is a perspective view of some of the components of a code message tape perforator primarily illustrating a combination tape stepping and backspacing mechanism, according to the present invention, showing its relationship to the punch and die assembly and with the backspace lever depressed to the position which activates the backspacing mechanism.
FIGURES 2 and 3 are, respectively, a plan view and an elevation view showing the inoperative condition of the backspacing mechanism and the operative condition of the normal stepping mechanism and the relative positions of the components under such conditions.
Figures 4, 5:
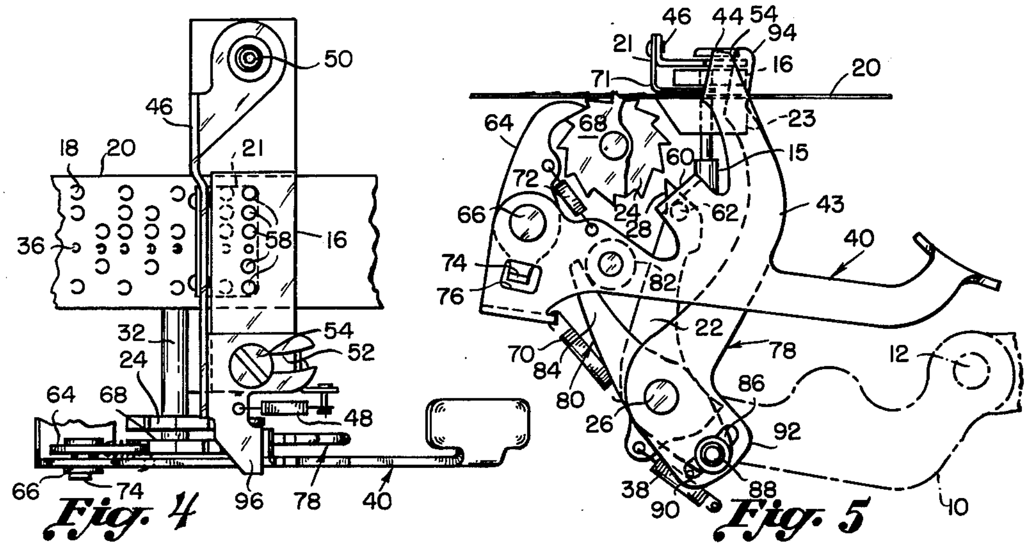
Figures 6, 7:
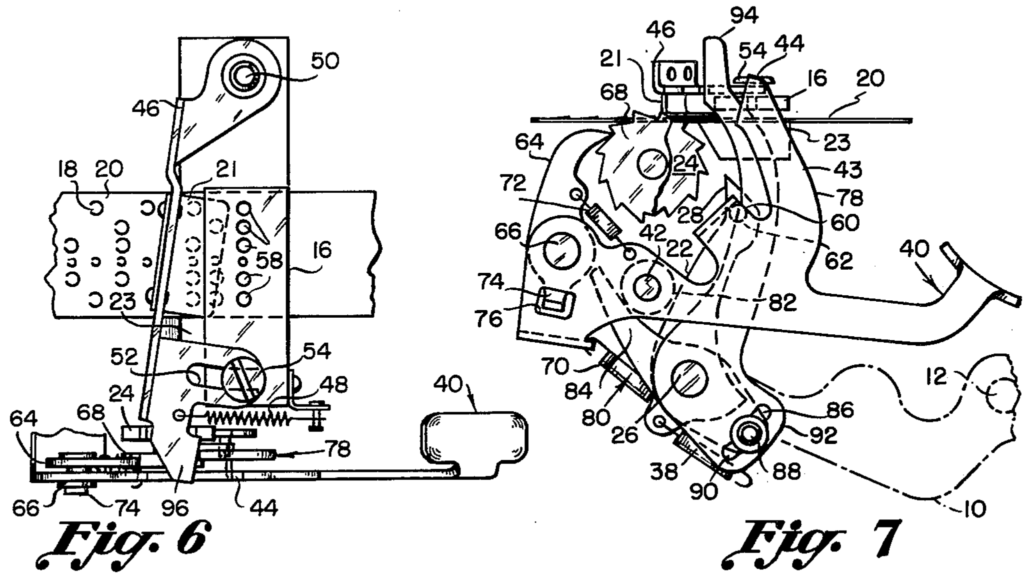

FIGURES 4 and 5 are, respectively, a plan view and an elevation view of the mechanism positioned as in FIGURE 1, the backspace lever being depressed, the stepping mechanism rendered inoperative and the backspacing mechanism actuated so that the lidded aperture closing blade is in a position which prevents the lids in the reversely moving tape from catching on the die block or in the die block holes; and FIGURES 6 and 7 are, respectively, a plan view and an elevation view showing the positioning of the stepping components upon occurrence of a perforator operational cycle when the back space lever is depressed, the lidded aperture closing blade being illustrated in the position it asumes after it has been kicked out of the path of the code hole punches.

DESCRIPTION

The present invention primarily relates to a backspacing device for use with a data processing record sheet perforator wherein perforations are made in the form of lidded apertures. The backspacing mechanism is incorporated into and is functionally inter-related with a stepping device previously used in tape perforators although equally applicable to other sheet form record perforators. Both the stepping mechanism and backspacing mechanism are illustrated in the drawings, however the basic feed components, which are well-known, will be only generally described, whereas the backspacing mechanism and structure which inter-relates it with the feed mechanism will be described in detail.

Tape feed occurs in steps, normally one for each punching cycle and thus must generally be directly correlated with punching. Although the result of the present invention is a more comprehensive and different combination, its basic organization is a tape feed mechanism operated directly by a cyclic punch assembly lever and includes back spacing linkage which has been used with conventional perforated tape and has been fully disclosed and described in an E. F. Kleinschmidt et al. Patent No. 3,014,095.

The punch arm assembly 10 (FIGURES 1 and 2) is shown in phantom to illustrate, in a general sense, the source of power in the complete perforator. It is not per se an aspect of the present invention, however it does supply the cyclic motivating power to the normal tape feed components and to new components operating in conjunction with the backspacing mechanism and specifically applicable to operate on chadless tape or data records with lidded apertures. Punch arm 10 undergoes a cyclic rocking motion about its pivot shaft 12 due to the action of a rotating eccentric cam 14 (shown in phantom) on the punch arm cam follower 13. Each cyclic operation of the perforator causes selected code punches 15 and the feed hole punch to undergo an operational cycle, moving into and out of associated die holes in the die block 16 to punch the lidded apertures 18 in the tape 20. An example of appropriate punch and die shapes for punching lidded apertures may be seen in U.S. Patent No. 2,273,909.

The tape feed pawl 22, working in conjunction with a feed ratchet wheel 24 (as best shown in FIGURE 3), is pivotally carried on a cross shaft 26 which is secured to the punch arm 10 and is first shifted up and then shifted down during each full cyclic oscillation of the punch arm 10. As the punch arm cross shaft 26 raises the pawl 22, the pointed pawl end 28 moves into firm bottoming engagement with a tooth of the tape feed ratchet 24 and, as the pawl continues its upward shift, forces the feed ratchet wheel 24 to rotate a distance equal to one character space on the tape 20. A common shaft 32 non-rotatably connects the feed ratchet wheel 24 to a tape feed sprocket 30, which thus is also rotated a distance equal to that of the feed ratchet 24 so that its feed pins or teeth 34, which are in engagement with the lidded feed hole apertures 36, move the tape 20, in a feed direction, one character space.

As the punch arm assembly 10 continues its upward movement the selected punches move into associated die holes and then the arm 10 rocks in a downward direction to complete its cyclic oscillation. The feed pawl 22, held in close contact with the feed ratchet 24 by a spring 38, moves down and back away from bottoming contact with the previously engaged tooth, ratchets back to engagement behind the next tooth and is in a position to again step the feed ratchet 24 upon occurrence of the next upward stroke of the punch arm assembly 10. A conventional spring loaded roller detent (not shown) cooperates with shaft 12 to assure a positive snap in the intermittent rotation and results in an accurate indexed position of the feed sprocket for each feed step. As long as the reperforator is in operation with the punch arm cycling, and until a backspacing function is initiated, this indexed stepping function of the tape feed sprocket will be repeated. The feed mechanism so far described, is not per se a part of the present invention.

In FIGURE 1, the lids of lidded apertures 18 are depicted in an exaggerated elevated position to better illustrate the nature of lidded holes 18 and to emphasize the fact that the tape 20 is of the chadless type. In actual practice in a machine incorporating the present invention, the lids of apertures 18 are pressed substantially completely back into their individual cut-outs after they are punched as the tape 20 passes through the passage slot between a special lid closing blade 21 and the lower punch guide block 23. The blade 21 is used to close the lidded apertures in both a feed and a backspace stepping of the tape, as will be described in more detail hereinafter.

To enable backspacing of the tape 20, a backspace lever 40, pivotally mounted on a pivot shaft 42 fixed in the side of the perforator frame, will be pressed down by the operator, causing lever 40 to rock CW about its horizontal pivot axis, i.e. shaft 42. Backspace lever 40, in addition to its operating arm, has three extensions, all of which will of course shift CW when the lever is pressed down. As lever 40 is operated CW, an upper extension moves away from a toe 96 on the end of a laterally disposed lever 46 to which the aforedescribed lid closing blade 21 is attached, unblocking the lateral lever 46 and permitting it to swing into operative position.

Clearly shown in FIGURES 1 and 2 the blade carrying lever 46 is pivoted at one end on a vertical stud 50 which is located to one side of the die stripper plate 47. It consists of a narrow flat arm which extends across the tape path adjacent the rear or exit side of the die assembly exit to terminate in a horizontally bent projection on the outer side of the die assembly, the projection including the aforedescribed toe 96 and a guide slot 52. When the toe 96 of lever 46 is unblocked, which under certain circumstances can occur upon CW shifting of the backspace lever upper extension arm 43, a biasing spring 48 urges the blade lever to rotate CCW (FIGURES 1 and 2) around its pivot stud 50. The front end slot 52 is arcuate about the axis of stud 50 and is slidably guided on the shank of a guide screw 54 fastened in the upper part of the die block 16.

Blade 21, which is the member that actually contacts the tape aperture lids, is a thin, bent metal plate with its vertical flange riveted or otherwise secured to the blade lever 46. Upon CCW movement of blade lever 46, the horizontal thin flange of blade 21, positioned with a close but free fit over the tape, sweeps across the upper surface of the tape 20, pressing against and assuring tight closing of the lids of the apertures 18. The operative backspace rest postion of blade 21, as shown in FIGURES 1, 4 and 5, results in the blade being sandwiched between the upper surface of the tape 20 and the lower surface of the die block 16. In such operative limit position, blade 21 will block the lower openings of the die holes 58 so that when the tape 20 is moved backwards, i.e., backspaced, the normally trailing edges of the lids of the apertures 18, which will be the leading edges during backspacing, cannot catch in the die holes 58 which could result in jamming of the perforator or tearing of the tape 20.

The above described unblocking of blade lever toe 96 occurs during the initial portion of depressing movement of the backspace lever 40 and then as the backspace lever 40 is further depressed toward completion of the backspacing operation stroke, a bent tab 60, on a second of the three backspace lever extensions, moves into engagement with a small pin 62 attached to and projecting from the side face of the toothed upper end 28 of the feed pawl 22, and through such engagement cams and holds the feed pawl 22 out of engagement with the feed stepping ratchet 24. Feed pawl disengagement is effected as long as the backspace lever 40 is held depressed. An instant later, during the depression stroke, a backspace pawl 64, which is pivotally mounted on a pivot stud 66 secured in extension of the backspace lever 40, is swung CW and also permitted to pivot CW into engagement with a tooth of a backspace ratchet wheel 68, with the result that completion of lever depression forces the backspace ratchet wheel CW a distance equivalent to one character space on the tape 20. The backspace ratchet wheel 68 is attached to the same shaft 32 as is the tape feed sprocket 30, and thus is rotated CW to step the tape 20 back one character space. At this stage the backspace lever is fully depressed.

Upon the operator's releasing of the backspace lever 40, a biasing spring 70 will urge it back to its normal inoperative position. During CCW pivotal movement of the backspace lever upon returning to its normal position, the backspace pawl 64 will ride back off of the tooth which it had engaged and, even though biased in a CW direction, by its spring 72, will be then lifted clear of engagement with the backspace ratchet 68 due to the pivot limiting action of lever 40 on a small angular tab 74, on the lower end of the backspace pawl 64, which extends into a rectangular hole 76 in the back lever 40. The tab 74 restricts backspace pawl travel under the urging of its biasing spring and positions the pawl 64 in disengaged condition for the next backspace function, and for enabling normal unimpeded feed stepping of the tape sprocket 30.

During CCW pivotal movement of the backspace lever, as it returns back to its inoperative position, the small pin 62 on the upper end of feed pawl 22, which is being urged CCW by its biasing spring 38, follows the forward or CCW motion of the angular tab 60, permitting the pointed end 28 of the feed pawl 22 to move back into normal engagement with the teeth of the stepping ratchet wheel 24. The angular tab 60 then continues its shift CCW until it is completely clear of the small pin 62 on the feed pawl 22 as the backspace lever 40 completes its return stroke to its normal, inoperative position. Cyclic actuation of the feed pawl 22 can now step the tape 20 with no disruption of function by the backspace lever 40.

To backspace more than one character space, the operator merely depresses the backspace lever 40 as many times as he desires and tape 20 will be backspaced one step for each depression in the manner as hereinbefore described.

The bend 71 between the horizontal and vertical flanges of blade 21 has a smoothly curved surface which, during a backspace movement, provides a converging tape channel entrance for the free edges of the tape aperture lids and presses down any lids of the apertures 18 that might be slightly hinged up out of their cut-out holes (as shown in FIGURE 1) so that they move smoothly past the die holes 58. In the event that a lid may be standing up in an abnormally high condition, it will not be pressed down into its cut-out hole 18, rather it becomes blocked by the curved bend of blade 21 and, as the tape continues its backspace shift, will be bent completely back and flattened between the blade 21 and the upper surface of the tape 20. Thus, even under such an abnormal second condition, the blade will still enable unimpeded movement of the lidded tape past the die holes 58 without jamming or tearing of the tape 20.

OVER-RIDING OF BLADE ACTION

Due to the mode of operation of the perforator to which the backspace mechanism is attached, the punch arm 10 may undergo its see-saw motion or cyclic oscillation during certain phases of the backspacing function, e.g., receipt of an incoming coded signal combination during backspacing. Under such circumstances, it is not only necessary to continue the blocking of the feed stepping pawl 22 by tab 60 and pin 62 to prevent the feed pawl from engaging the stepping ratchet 24 at the same instant the backspace pawl 64 engages the backspace ratchet 68, but it also becomes imperative to remove the lid closing blade 21 from its blocking position, as shown in FIGURES 1 and 4, under the die holes 58. Otherwise, the invariably operated feed punch and any selected punches 15 which are moved through a punch cycle by the punch arm 10, can result in perforating of the lid closing blade 21 or, more likely, will result in broken punches. The mechanism and method for automatically removing the blade 21 upon occurrence of cyclic oscillation of the punch arm during backspacing, will be described in succeeding paragraphs.

As hereinbefore described, whenever the backspace lever 40 is depressed, the feed stepping pawl 22 is blocked and moved to inoperative position by the angularly bent tab 60 on the backspace lever 40, as shown in FIGURE 5. Should the punch arm 10 then move upward as it starts a cycle of operation, the feed stepping pawl 22, which is pivotally mounted on the punch arm cross shaft 26, must also shift upwardly. However, during a backspace operation the small feed pawl pin 62 is engaged and shifted by the backspace lever tab 60 to disable feed engagement by the feed pawl. That pin 62, during a feed pawl stroke, rides along the underside of the tab 60, which therefore continues to maintain the poined end 28 of the feed stepping pawl 22 out of engagement with the teeth of the stepping ratchet 24 even during an up and down feed pawl stroke. Thus, as long as the backspace lever 40 is depressed, forward tape stepping functions are positively prohibited. Even though the stepping pawl may be undergoing cyclic operation, it cannot engage the feed ratchet wheel until the backspace lever 40 is released, and when it is released the backspace pawl 64 is always positively disengaged from the backspace ratchet 68 an instant before the feed stepping pawl 22 can again engage the stepping ratchet 24. Only when the backspace lever is in inoperative position can normal stepping operation be resumed.

Even though feed stepping cannot occur during backspacing, the action of the punches may occur at certain stages of the backspace function, as has been hereinbefore described. Recalling that during backspacing, the lid closing blade 21 is permitted to move into position under the die block to close the lidded apertures 18 and to block contact between the tape and the die punch holes 58 in the die block 16, it will be understood that if the blade is permitted to remain in blocking position, it will be directly in the path of any punches that might operate during a backspacing operation. To avoid disastrous effects to the punches, die block and/or lid closing blade that could occur under the just described condition, an over-riding blade removal action is provided. Upon cycling of the punches, the lid closing blade 21 is momentarily kicked out of the path of any operating punches 15 (see FIGURES 6 and 7) by a blade kickout lever 78 which is vertically disposed and situated parallel and adjacent to the upper arm 43 of the backspace lever. Kick-out lever 78 is normally biased to an inactive position, illustrated in FIGURES 3 and 5, but it has its lower end pivotally mounted on the punch arm cross shaft 26 and thus will oscillate up and down whenever the punch arm is rocked through an operative cycle, an action which is invariably accompanied by one or more punching operations.

To enable an operative shift of the kick-out lever, additive to the oscillation caused by rocking the punch arm, a kick-out operator lever arm 80 with a tapered upper end 84 is pivotally mounted on the punch arm cross shaft 26 immediately adjacent the kick-out lever 78, and is adjustably clamped at an angle to lever 78 adjacent its lower end 86. The tapered end 84 of arm 80 slidably engages a roller 82 disposed on the back space lever support shaft 42. The angle formed between operator lever arm 80 and the kick-out lever 78 can be adjusted by loosening a clamping screw 88 passing through an arcuate slot 90 in lever 80 and threaded into the lower end of the kick-out lever 78. When the desired adjustment is attained, the two lever arms 78 and 80 are rigidly clamped together and will reciprocate and pivot as a unit on the punch arm cross shaft when the punch arm rocks through its cycle.

During all punch arm rocking operations the kick-out lever 78 and its operator arm 80 (operating as a single lever) move up and down with the see-saw motion of the punch arm 10. Due to cooperative pairing between the operating arm 84 and the fixed axis roller 82, maintained in engagement by a biasing spring (not shown), the levers 78 and 80 will pivot CCW on the up stroke and CW on the down stroke. The resultant compound movement of kick-out lever 78 occurs during every cyclic movement of the punch arm but is utilized only during a backspace operation. There is no need for its function during normal feed steps.

When the punch arm 10 moves up during its operative cycle, kick-out operator arm 80 moves up and the resultant action of its tapered upper end 84 sliding along the roller 82 forces the arm 80 and the kick-out lever 78 to be instantly rotated CCW. Under such condition and if the backspace lever 40 is depressed to place blade 21 in blocking position (as shown in FIGURES 6 and 7), a vertical edge on the upper end 94 of kick-out lever 78 will move to the left to abut the extended toe 96 of the blade carrying lever 46, instantly kicking the lever 46 CW, overpowering the tension of the blade lever biasing spring 48 to shift the blade 21 out of the path of the feed punch and any selected punches an instant before they perforate the tape 20 and enter the die block 16. During the succeeding downward travel of punch arm 10, the tapered end 84 of operating arm 80 slides down the roller 82, releasing the CCW force being applied to the kick-out lever 78. As the force terminates, if the backspace lever is still depressed, the blade lever biasing spring 48 pulls the blade carrying lever 46 back to its normal backspacing position, that is, with the attached blade 21 again sandwiched between the tape 20 and the punch die 16, thereby preventing the lids of the lidded apertures 18 from catching on the punch die holes 58 as the tape 20 is being backspaced.

When the backspacing operation has been completed, the backspace lever 40 is released to, in turn, release the feed stepping pawl 22 so that it may again engage the ratchet 24 upon resumption of normal stepping operations.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In combination, a perforator for punching lidded aperture coded information perforations in record media with record media feed means comprising: a lidded aperture punch and die assembly; means adapted to positively engage with a record medium to enable spacing the record medium in both directions through said punch and die assembly; a cyclically operated power means; feed linkage means connected to said power means adapted to incrementally engage and drive said record media spacing means one step in a forward feed direction responsive to each operative cycle of said power means; oscillatory backspace operating means adapted upon a single operation to engage and drive said record media spacing means one step in a backspace direction; shiftable means mounted for shifting movement into blocking position between the lidded aperture portion of said record medium and the entrance portions of the die holes of said punch and die assembly to provide an unbroken plane surface engaging and leveling the lidded apertures in the vicinity of the entrance to said die holes; and means on said backspace operating means enabling shifting of said shiftable means into blocking position upon initial operation of said backspace operating means.

2. A perforator combination as defined in claim 1, further comprising: means rendered operable during a cycle of operative movement of said power means for engaging and positively inhibiting disposition of said shiftable means in its said blocking position immediately prior, during and immediately after actual punch and die cooperation resulting from a punching stroke power cycle.

3. A perforator combination as defined in claim 2, wherein said backspace operating means includes means adapted to engage a portion of said feed linkage means, concurrently with actual backspace movement of the record medium, and accomplish disabling of engagement between said feed linkage means and said spacing means.

4. In combination, a perforator for punching lidded aperture coded information perforations in record media with record media feed means comprising: a lidded aperture punch and die assembly including a record guide slot transverse to the die holes; means adapted to positively engage with a record medium to enable spacing the record medium in both directions through said punch and die assembly guide slot; a cyclically operated power means; feed linkage means connected to said power means adapted to incrementally engage and drive said record media spacing means one step in a forward feed direction responsive to each operative cycle of said power means; oscillatory backspace operating means adapted upon a single operation to engage and drive said record media spacing means one step in a backspace direction and, concurrently with actual backspace movement of the record medium, to disable engagement between said feed linkage means and said spacing means; shiftable means including a thin smooth planar blade mounted for shifting movement of said blade into blocking position in said guide slot between the lidded aperture portion of said record medium and the die holes of said punch and die assembly to provide an unbroken plane surface engaging and leveling the lidded apertures in the vicinity of the entrance to said die holes; and means including a control means on said backspace operating means enabling permissive shifting of said shiftable means into blocking position upon initial operation of said backspace operating means.

5. A perforator combination as defined in claim 4, wherein said means enabling permissive shifting of said shiftable means includes a biasing spring connected to and urging said shiftable means toward its blocking position, and said control means comprises a lug means on said backspace operating means normally engaging said shiftable means, in the inoperative position of said backspace operating means, and holding said shiftable means out of its blocking position against the force of said biasing spring, said lug means releasing its holding action on said shiftable means upon initiation and during any backspacing operation of said backspace operating means.

6. A perforator combination as defined in claim 5 further comprising a positively shifted lever means rendered operable during a cycle of operative movement of said power means for moving into engagement with and to move said shiftable means against its spring bias force to positively inhibit disposition of said shiftable means in its blocking position immediately prior, during and immediately after actual punch and die cooperation during a punching stroke power cycle, whenever said shiftable means is enabled to accomplish permissive shifting upon operation of said backspace operating means.

7. In combination with a record media stepping mechanism, including backspace stepping mechanism, for use with perforated record media having lidded apertures, the improvement comprising: a shiftable record aperture lid guide device adapted to move between a normal position and an operative backspace guide position, in both of which positions said guide device engages the aperture lids and maintains them in close pressed disposition into their associated apertures; biasing means urging said device to its operative backspace guide position; means on said backspace stepping mechanism normally engaging and exerting a force maintaining said guide device against the force of said biasing means into its normal position and shifted, upon initiation of a backspace operation of said backspace stepping mechanism, to release its action on said guide device to permit said guide device to be shifted under the force of said biasing means to its operative backspace guide position.

8. The combination defined in claim 7, wherein said record stepping mechanism includes record stepping feed mechanism and punching mechanism operable cyclically upon receipt of code signals; and said punching mechanism includes means adapted to engage said guide device to positively prohibit disposition of said guide device in its operative backspace guide position at least during actual punching strokes even though a backspacing operation is occurring.

9. The combination defined in claim 8, wherein means on said backspace stepping mechanism is adapted to engage a portion of said feed mechanism and disable operability of said feed stepping function whenever a backspacing operation is occurring.

10. A feeding device for flat records with lidded apertures comprising' cyclically operated step feeding means for engaging and stepping the lidded aperture records relative to a punch and die assembly; means including a portion of said feed means for backspacing the record including a thin flat member adapted to be disposed, upon initiation of a backspacing operation, between the lid portions of the record and the die hole entrance portion of the punch and die assembly in leveling engagement with the lid portions of the record and auxiliary means adapted to engage and disable the normal forward tape feeding means; and means operative during a punch operating cycle whenever backspacing is being undertaken for temporarily removing said thin flat member from between the punches and die hole entrances and the tape, during that portion of the punching stroke wherein the punches and dies are in matched cooperation.

11. A data processing coded information perforator comprising: means including a record medium work station slot for code perforating lidded apertures in a record medium adapted to be stepped through said slot; means to engage and move said record medium in a feed direction through the slot of said perforating means; means to engage and move said record medium in a backspace direction through the slot of said perforating means; and means including a flat lid leveling blade adapted to be shifted into the work station slot of said perforating means in planar surface engagement against the lids of said lidded apertures to enable smooth reverse passage of the lidded aperture record medium through said perforating means.

References Cited by the Examiner

UNITED STATES PATENTS

| | | | |
|---|---|---|---|
| 2,255,794 | 9/1941 | Lake | 234—129 X |
| 2,648,385 | 8/1953 | De Boo | 234—46 X |
| 3,013,716 | 12/1961 | Sim | 234—129 |

ANDREW R. JUHASZ, *Primary Examiner.*

WILLIAM S. LAWSON, *Examiner.*